US008327286B2

(12) United States Patent
Deutsch et al.

(10) Patent No.: US 8,327,286 B2
(45) Date of Patent: Dec. 4, 2012

(54) UNIFYING APPLICATION LAUNCHERS AND SWITCHERS

(75) Inventors: Rebecca Jeanette Deutsch, Seattle, WA (US); Benjamin Alexander Betz, Redmond, WA (US); Stephan Hoefnagels, Seattle, WA (US); Chaitanya D. Sareen, Seattle, WA (US); Bret P. Anderson, Kirkland, WA (US); Robert James Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/047,773

(22) Filed: Mar. 13, 2008

(65) Prior Publication Data

US 2009/0235200 A1  Sep. 17, 2009

(51) Int. Cl.
*G06F 3/048* (2006.01)
*G06F 9/445* (2006.01)

(52) U.S. Cl. ........ 715/778; 715/781; 715/783; 717/168; 717/174

(58) Field of Classification Search .................. 715/778, 715/779, 783, 810, 825, 835, 840, 846, 847, 715/781; 717/174, 176, 177, 168
See application file for complete search history.

(56) References Cited

U.S. PATENT DOCUMENTS

| | | | | |
|---|---|---|---|---|
| 6,456,307 B1* | 9/2002 | Bates et al. | ..................... | 715/838 |
| 6,756,999 B2 | 6/2004 | Stoakley et al. | | |
| 6,864,905 B2* | 3/2005 | Meaden | ........................ | 715/806 |
| 6,925,609 B1 | 8/2005 | Lucke | | |
| 7,216,297 B1* | 5/2007 | Douglis et al. | ................ | 715/760 |
| 7,310,783 B2* | 12/2007 | Pagan | ............................. | 715/840 |
| 2002/0122076 A1* | 9/2002 | Nakaki | ......................... | 345/847 |
| 2004/0066414 A1 | 4/2004 | Czerwinski et al. | | |
| 2005/0166159 A1* | 7/2005 | Mondry et al. | ................ | 715/769 |
| 2005/0278651 A1* | 12/2005 | Coe et al. | ....................... | 715/779 |
| 2006/0123353 A1 | 6/2006 | Matthews et al. | | |
| 2006/0212497 A1* | 9/2006 | Tomita | .......................... | 707/205 |
| 2006/0277500 A1* | 12/2006 | Sawano | ......................... | 715/835 |
| 2007/0094597 A1 | 4/2007 | Rostom | | |
| 2007/0143702 A1* | 6/2007 | Maggi | ............................ | 715/779 |
| 2007/0157099 A1* | 7/2007 | Haug | ............................. | 715/769 |
| 2007/0180398 A1* | 8/2007 | McArdle | ........................ | 715/781 |
| 2007/0180407 A1* | 8/2007 | Vahtola | ......................... | 715/847 |
| 2007/0245256 A1 | 10/2007 | Boss et al. | | |

OTHER PUBLICATIONS

True Launcher 2.8, http://true-launcher.truesoftware.qarchive.org/, Nov. 30, 2007.

TopDesk 1.5.3 Free Download, http://topdesk.otaku-software.alienpicks.com/, Nov. 30, 2007.

ObjectDock 1.2 Download, http://download.soft-317-30359.butterflydownload.com/objectdock/, Nov. 30, 2007.

(Continued)

*Primary Examiner* — Tadeese Hailu
(74) *Attorney, Agent, or Firm* — Shook, Hardy & Bacon L.L.P.

(57) ABSTRACT

Embodiments of the invention provide a method, system, and media for intelligently presenting buttons that correspond to running windows as well as a set of application launchers that launch instances of software applications. One version of the method includes receiving an indication that an instance of a software application has been invoked by a launching mechanism, which leads to creating a windowed process in which to present the instance of the software application; determining that at least one of the application launchers was the launching mechanism; automatically removing the launcher(s) from view; and presenting a button that corresponds to the windowed process.

19 Claims, 10 Drawing Sheets

OTHER PUBLICATIONS

Rearrange Your Taskbar Buttons, http://findarticles.com/p/articles/mi_zdpcm/is_200112/ai_ziff19195, Dec. 2001.

Avant-Window-Navigator, http://code.google.com/p/avant-window-navigator/, Nov. 30, 2007.

Taskbar Button Manager, http://www.innovative-sol.com/taskbar-button-manager/index.htm, Nov. 26, 2007.

MAC 101: The Dock, http://docs.info.apple.com/article.html?artnum=304728, Dec. 19, 2007.

* cited by examiner

UNIFYING APPLICATION LAUNCHERS AND SWITCHERS

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. At a high level, our disclosure describes reducing redundancy in presenting application launchers and application switchers (which often take the form of buttons that can be used to switch applications) so that a user interface does not doubly present application launchers that could serve as buttons and vice versa. We also describe new ways of identifying and grouping similar switcher buttons (indications of running applications), and ways for rearranging buttons as desired. Application launchers and switchers can be unified irrespective of a state of a windowed process. That is windows that are any state (maximized, minimized, and in between) can be unified with application launchers.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein.

DETAILED DESCRIPTION

Figure 1:
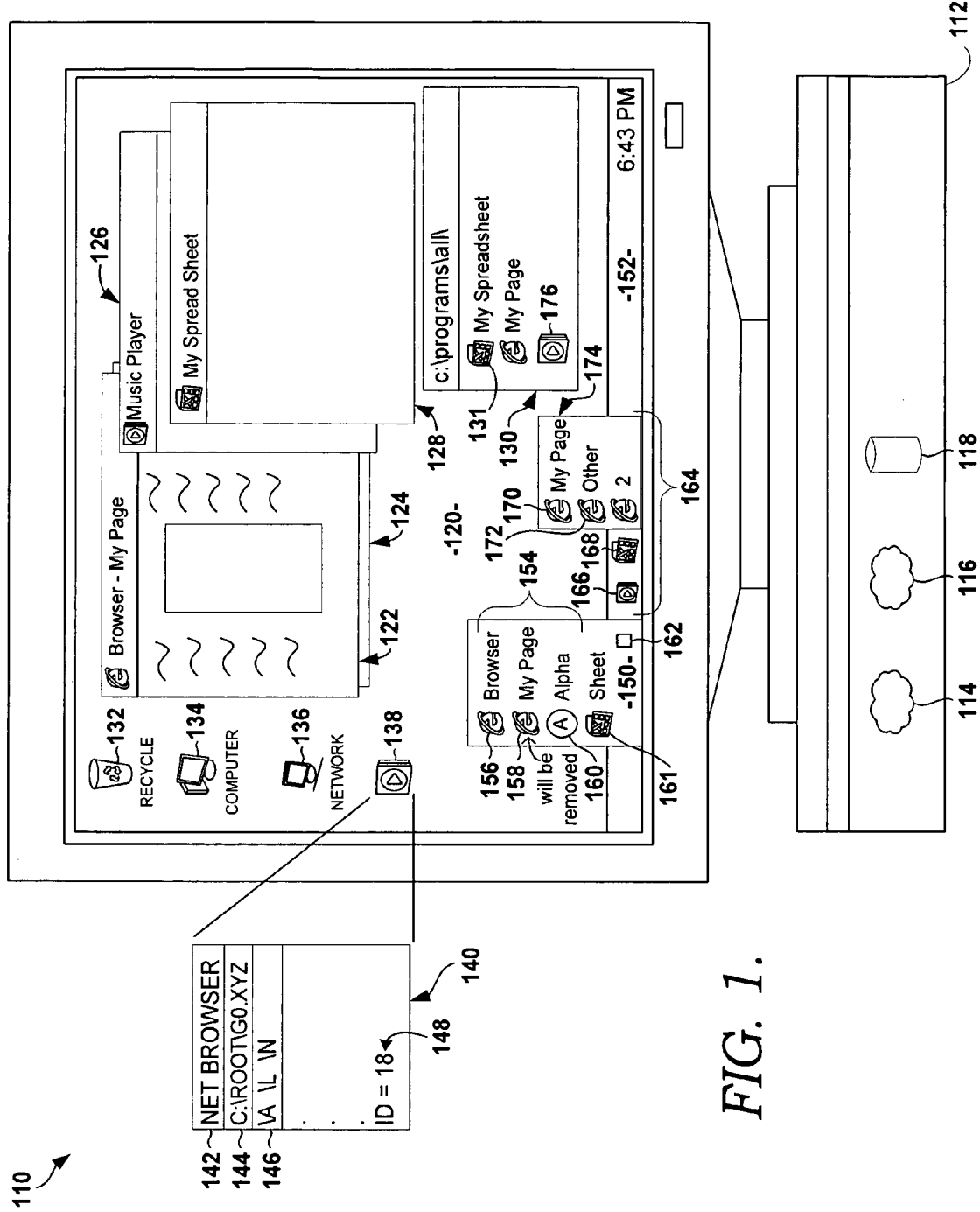
FIG. 1 depicts an illustrative operating environment suitable for practicing an embodiment of the invention.

Turning now to FIG. 1, an illustrative operative environment suitable for practicing an embodiment of the invention is provided and referenced generally by the numeral 110. Operating environment 110 includes a computing device 112, which is schematically described in greater detail in FIG. 3, which we will briefly describe now.

Figure 3:
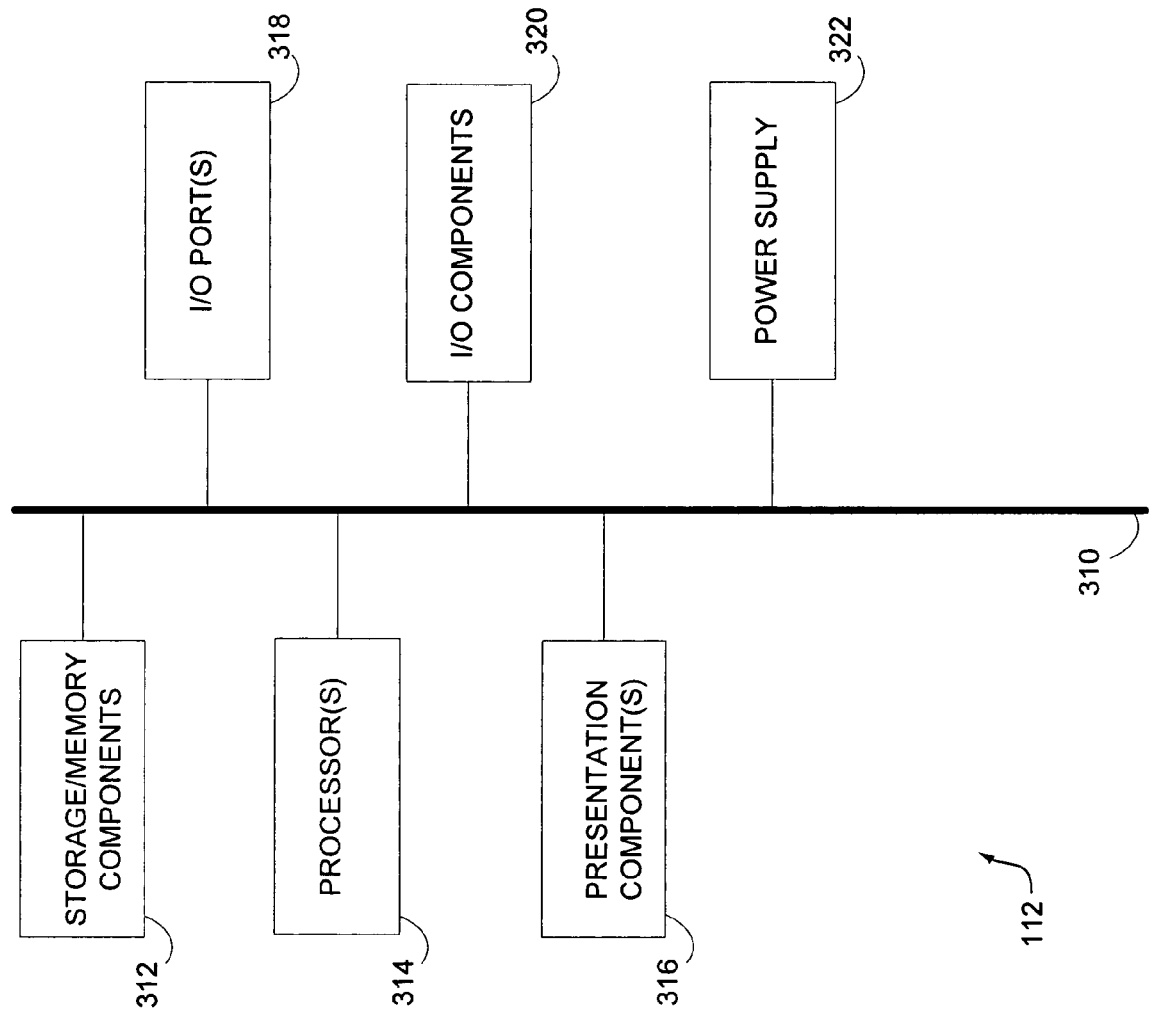
FIG. 3 depicts a block diagram of a computing device suitable for operation in accordance with an embodiment of the present invention.

Turning to FIG. 3, a diagrammatic block diagram of computing device 112 is provided. Computing device 112 may take on a variety of forms, including, for example, a computing device such as a gaming console, a client computer, a server computer, variations thereof such as laptop computers and palm-top computers, and in some embodiments devices such as PDAs and smart phones. As shown in FIG. 3, a bus 310 couples one or more memory components 312 to one or more processors 314, various presentation components 316, input/output ports 318, input/output components 320, and at least one power supply 322. Other devices including lower level aspects of the shown devices are not shown so as to not obscure the invention.

Memory components 312 include things such as a hard drive, volatile memory (such as RAM), buffers, and the like. The one or more processors 314 control overall data communications throughout computing device 112. Illustrative presentation components 316 include a video card as well as a monitor or other presentation device. Input/output ports 318 provide connectivity to peripheral components such as printers, digital cameras and the like. Actual input/output components may be things like printers and the like. A power supply 322 provides power to run computing device 112. Not all of the components shown in FIG. 3 need to be present in order to make up a computing device, but are shown for illustrative purposes in connection with describing an embodiment of the invention.

Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 3 is merely illustrative of an exemplary computing device that can be used in connection with one or more embodiments of the present invention.

Computing device 112 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; carrier wave; or any other medium that can be used to encode desired information and be accessed by computing device 300.

Returning now to FIG. 1, operating environment 110 includes, computing device 112, which includes an operating system 114, a set of computer executable instructions 116 that help carry out various aspects of the invention, and a data store 118. Operating system 114 can be any operating system. Instructions 116 are embodied on one or more computer readable media, and although shown as one cloud may actually be composed of several constituent parts, which alone or in combination work to facilitate various aspects of the present invention. Data store 118 can be used in some embodiments to store identifiers that will be referred to in greater detail throughout this disclosure. In other embodiments, such identifiers are stored as metadata with the things that they relate to.

Computing device 112 presents a screen 120 that includes various windows. These windows are referenced by numerals 122, 124, 126, 128, and 130. Generally, these windows present windowed processes to a user. In some situations, a windowed process corresponds to a running application. In other situations, an application may have multiple instances, each of which can run as its own windowed process. These can be multiple instances of the same application, or instances of similar aspects of an application, or independent applications. For example, consider browsing-page 122. Reference numeral 122 refers to a specific instance of an internet browser; namely, a window entitled "Browser-My Page." But another instance of the browser is shown by reference numeral 124. Thus, multiple instances of an application (e.g., an internet browser) can be run. By way of another example, a software application can also be a web application, such as an Internet photo-management utility, script-based utility, and the like.

Various icons are also illustratively shown on screen 120. For example, a trash icon 132, a computer icon 134, a network icon 136, as well as a media-player icon 138 are illustratively shown. We will variously use the term "launching mechanism" to refer to any software component capable of spawning or initiating a process that gives rise to an application or an instance of a software application (Java applet, web application, web-page instance, etc.) that can be presented in a windowed process. Icons are examples of launching mechanisms. But other items can serve as launching mechanisms as well, even other applications. Generally, each icon is associated with a set of properties that can take on various values.

By way of example, media-player icon 138 is illustratively shown to be associated with a set of properties that are diagrammatically represented by reference numeral 140. In some embodiments, these properties 140 are stored as metadata as part of the icon file itself. In other embodiments, all or a portion of the properties are stored in a different area, such as data store 118 by way of example. Only a few illustrative properties 140 are shown. The first illustrative property includes a name 142 that is associated with the icon. Another illustrative property includes an indication of a file that spawns the application associated with the corresponding icon. In some embodiments, this attribute 144 includes the path to the file or component that spawns a windowed process.

In some operating systems, such a file takes the form of an executable file, which is a file that ends with a ".exe" extension. We do not mean for the definition of an "executable" file to be so narrow as to only include files with a ".exe" extension. Such an executable file is not the only type of files that can be used to spawn windowed processes. Some operating systems use different file types or processes. But to the extent any file or group of files is used to launch an application, we would have the same fall within the definition of "executable file."

Another illustrative property of an icon includes a listing of switches 146 or other parameters that can be associated with the launching mechanism. These parameters can be utilized in connection with a launching process to either launch it a certain way in some circumstances or to launch it based on user settings, and the like.

According to one embodiment of the present invention, an application ID 148 is associated with icon 138. Application ID 148 identifies an application or an instance of an application that is launched by its corresponding launching mechanism. Here, application ID 148 takes on the value of "18," which is illustrative and simple in nature to explain the concept that such an identifier 148 identifies an application that is launched by icon 138. As previously mentioned, application ID 148 can be stored as metadata associated with its corresponding launching mechanism, or it can be stored in a location separate from its corresponding launching mechanism.

In operating environment 110, we show properties 140 being illustratively associated with icon 138. Although not shown, it can be the case that each icon is respectively associated with its own set of properties. Thus, network icon 136 is associated with its own set of properties as is computer icon 134, and the others. These are not shown for the sake of conciseness. Various windows of screen 120 can also be associated with a set of properties. We will explain this in greater detail in connection with explaining FIGS. 4 and 5. But summarily, each window can also be associated with a set of properties in a similar fashion to the way properties 140 are associated with launching mechanisms.

In one embodiment of the present invention, as an application is being launched, its corresponding process is informed of the launching mechanism that was used to launch the process. In this way, a windowed process is also provided an application identifier that identifies a specific application and even an instance of an application including an instance of a hosted application that is hosted by another process.

Screen 120 illustrates two user-interface portions, including UI portion 150 as well as UI portion 152. UI portion 150 provides a portion of a user interface to receive application launchers that, in many cases, are designated by a user to reside in UI portion 150. These are referenced by the numeral 154, and are commonly known as quick-launch icons, but can be any UI mechanism that contains a set of icons in a user-interface portion that is readily accessible to users to launch applications. We show three illustrative application launchers: a generic browser launcher 156, a specific instance of a browser application 158 (which opens "My Page"), and a final application launcher 160 which takes the fictitious name of "Alpha," which indicates that a variety of different types of application launchers can be included in area 150.

In one embodiment, UI portion 150 is not always presented to a user. In some embodiments, UI portion 150 is in line with UI portion 152 such that only a few icons are presented to a user. In such an embodiment where application launchers 150 are not persistently presented, another UI mechanism 162 can be provided for a user to click on, that when clicked on, reveals all of the available application launches, or at least a much larger set.

A set of buttons 164 is also provided in one embodiment of the invention. Four illustrative buttons are shown: namely a media-player button 166, a spreadsheet button 168, a specific browser button 170 (corresponding to a specific webpage, e.g., "My Page"), and a generic browser button 172. According to one embodiment of the invention, buttons 170 and 172 are grouped together into a grouping area 174, which can also remain in a collapsed state until a user interacts with it, which would result in the illustrative state shown. Screen 120 illustrates that buttons 164 can correspond to running processes.

For example, the presence of buttons 164, sometimes known as "switchers," can indicate the presence of running windowed processes. For example, the presence of media-player button 166 is consistent with the presence of music-player window 126. Similarly, the presence of spreadsheet button 168 illustrates that a specific instance of a spreadsheet program is running; namely, "My Spreadsheet" window 128. Two more illustrative examples show that a specific browser page 122 corresponds to a specific browser icon 170, and a generic browser page 124 corresponds to a generic browser button 172.

As previously mentioned, these buttons can sometimes be referred to as switchers because they provide the ability for a user to switch between running applications such that if a user would select one of the buttons then the corresponding windowed process would be presented. A button corresponding to window 130 is not shown for space considerations.

Having described an illustrative operating environment, we will now begin to describe an aspect of our invention. This aspect of the invention is directed to a method of intelligently presenting buttons 164 as well as application launchers 154. In some situations, it may be desirable to eliminate redundancy such that duplicates are not duplicated among application launchers 154 and buttons 164. For example, consider the specific instance of a browser page 122. This browser page 122 is presenting a specific webpage; namely, a webpage that is entitled "My Page." In an embodiment of the present invention, we enable a launcher to actually be associated with the specific instance 122 of a browser page.

Other inventions in the art do not allow this. For example, other inventions only allow an application launcher to be associated with the application itself. This would be the case with application launcher 156, which is a launcher associated with only a web-browsing application. It is not associated with a specific webpage. But, according to an embodiment that is made possible by the present invention, application launcher 158 is a launching mechanism that is specifically associated with a specific webpage, not only the application itself.

In our example, with the specific browser instance 122 running, we show a potentially undesirable state, which is the presence of both application launcher 158 as well as button 170. If you conserve real estate among other things, it may be desirable to only show one instance of a mechanism that would enable bringing the browser instance 122 to the focus. Thus, according to an embodiment of the present invention, application launcher 158 will be removed from UI portion 150 as long as the specific instance 122 of the browser is running, and its corresponding button 170 is present.

Figure 2:
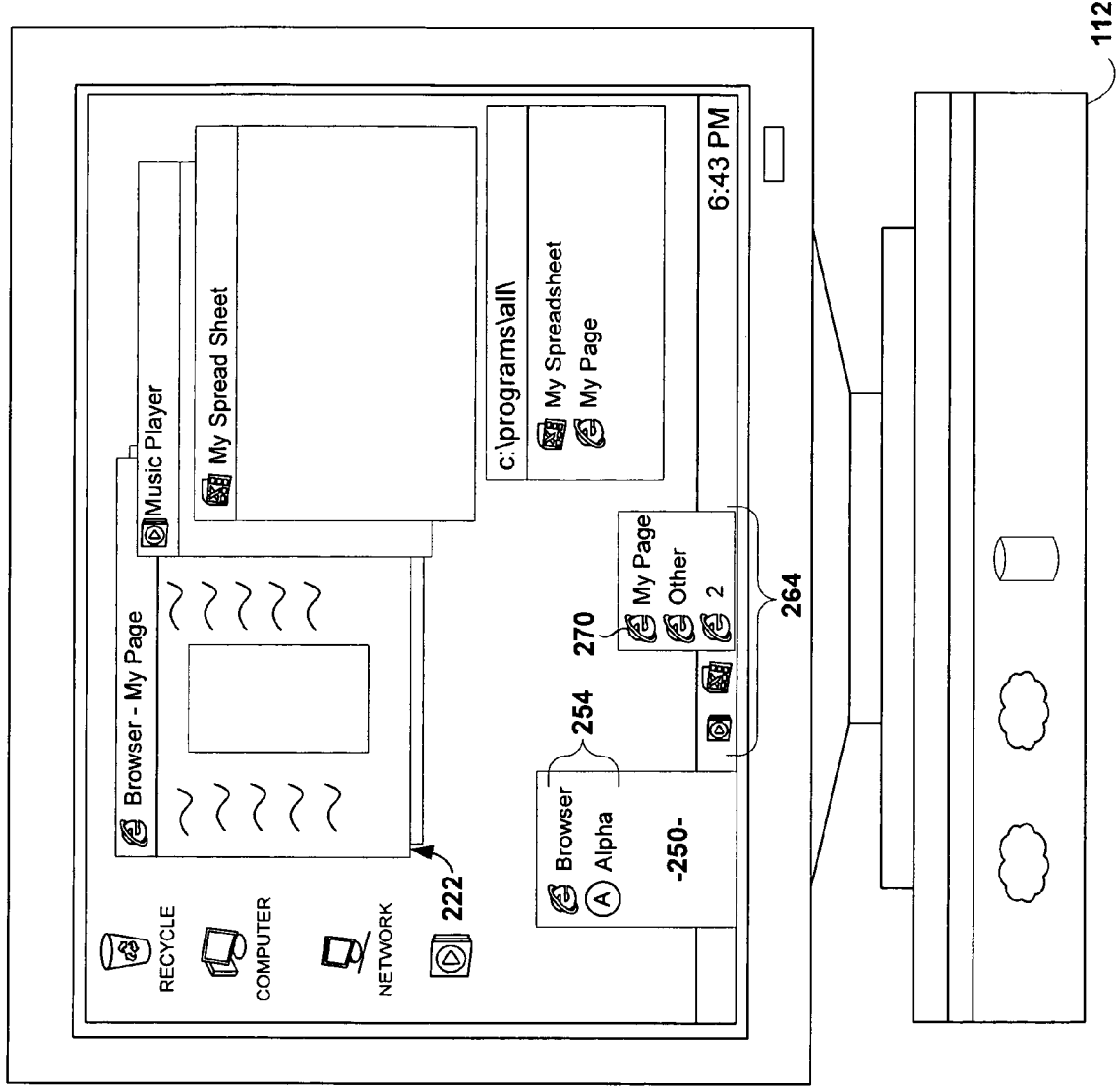
FIG. 2 depicts, among other things, an elimination of redundancy regarding a set of application launchers (254) and buttons (264) that correspond to running processes according to an embodiment of the present invention.

We will explain the above in greater detail below, but FIG. 2 offers a diagram that shows what might be viewable according to the example given above. We will use different reference numerals to make referring to items in FIG. 2 easier, but the different reference numerals do not imply that all of the items shown on FIG. 2 are different than those depicted in FIG. 1. We will try to use like reference numerals to refer to like elements in FIG. 1. As can be seen in FIG. 2, UI portion 250 no longer includes application launcher 158, which was operable to spawn a specific webpage in windowed process 222. This instance 158 is not present among the remaining group of application launchers 254. But button 270 (corresponding to button 170 on FIG. 1) is still present. This button 270 is available to present windowed process 222. If it were the case that application launchers 254 were so few as to be visible in user interface portion 250 even in a collapsed state, and if what was button 158 would have also been visible without expanding UI portion 250, then that button 158 would still be removed to eliminate the redundancy.

Figure 4:
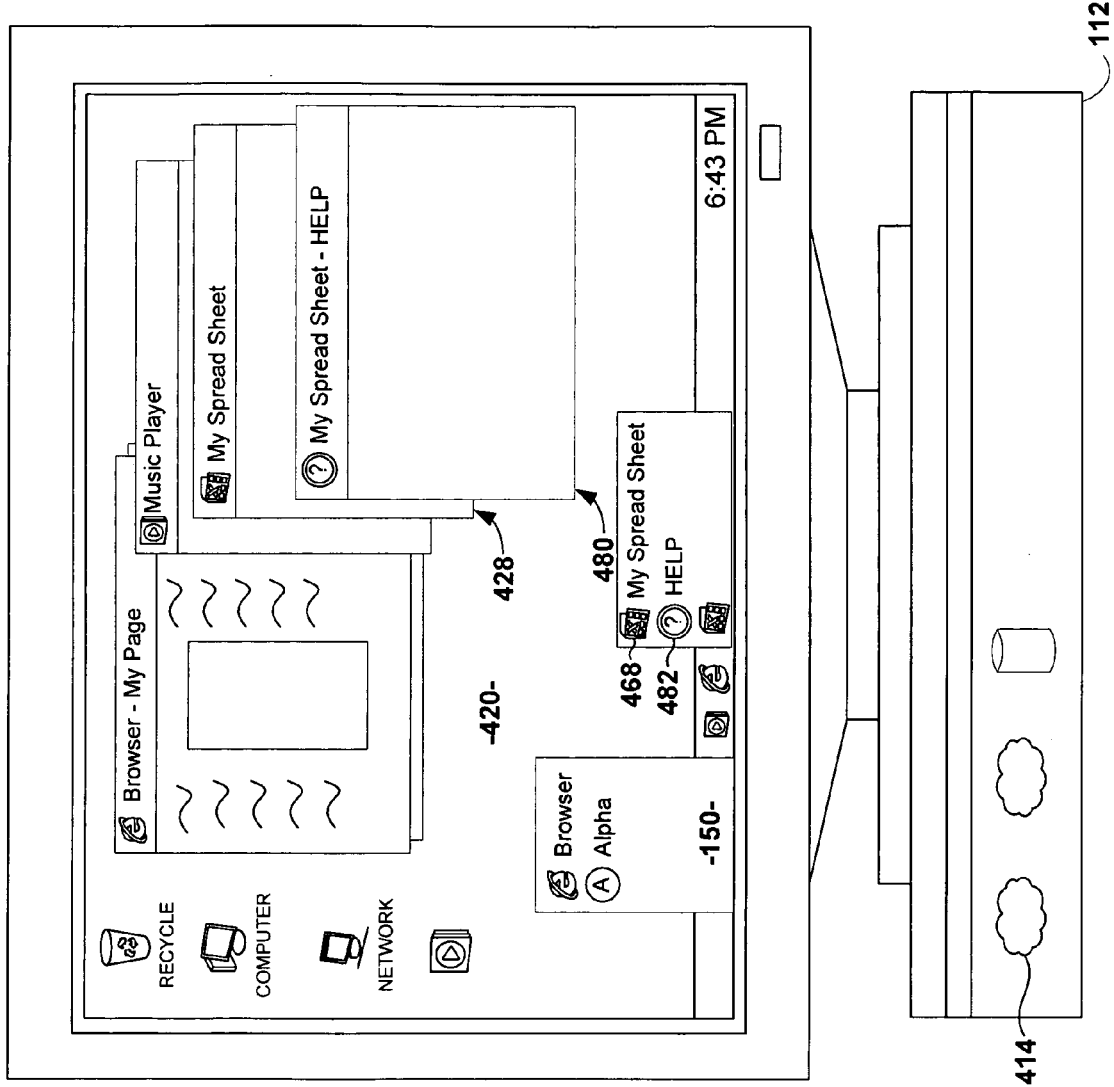
FIG. 4 depicts grouping seemingly disparate processes in a single group according to an embodiment of the present invention.

Turning now to FIG. 4, another illustrative aspect of the invention can be observed by referring to screen 420. Again, we will use like numerals to refer to corresponding items in FIG. 1. Sometimes, it can be the case that what appears to a user to be part of the same application appears to be different processes or applications to operating system 414. That is, a first application is spawned by a first file, and a separate file results in the spawning of what the operating system might consider to be a separate file.

Turning to screen 420, consider spreadsheet window 428 and help screen 480. It may be the case that spreadsheet window 428 is spawned by a first process, and help screen 480 is spawned by a different file that led to window 428. In some other inventions, icons representing these windows (e.g., icons 468 and 482) would not be grouped together because operating system 414 would view them as not the types of buttons or switchers that should be grouped together based on the fact that they are each respectively associated with different files. But according to an embodiment of our invention, such buttons would be grouped together. That is, we offer a way to group together buttons that correspond to windows that users would likely think to be part of the same application.

The help window of a spreadsheet application might reasonably be thought of to be the same application as the spreadsheet application in window 428. Although we will explain this in greater detail below, one way of accomplishing such grouping is to provide window 480 with the application ID associated with the application that is being run in window 428 so that it, in some embodiments' other parameters, can be utilized to identify buttons that should be grouped together, but not replaced.

Figure 5:
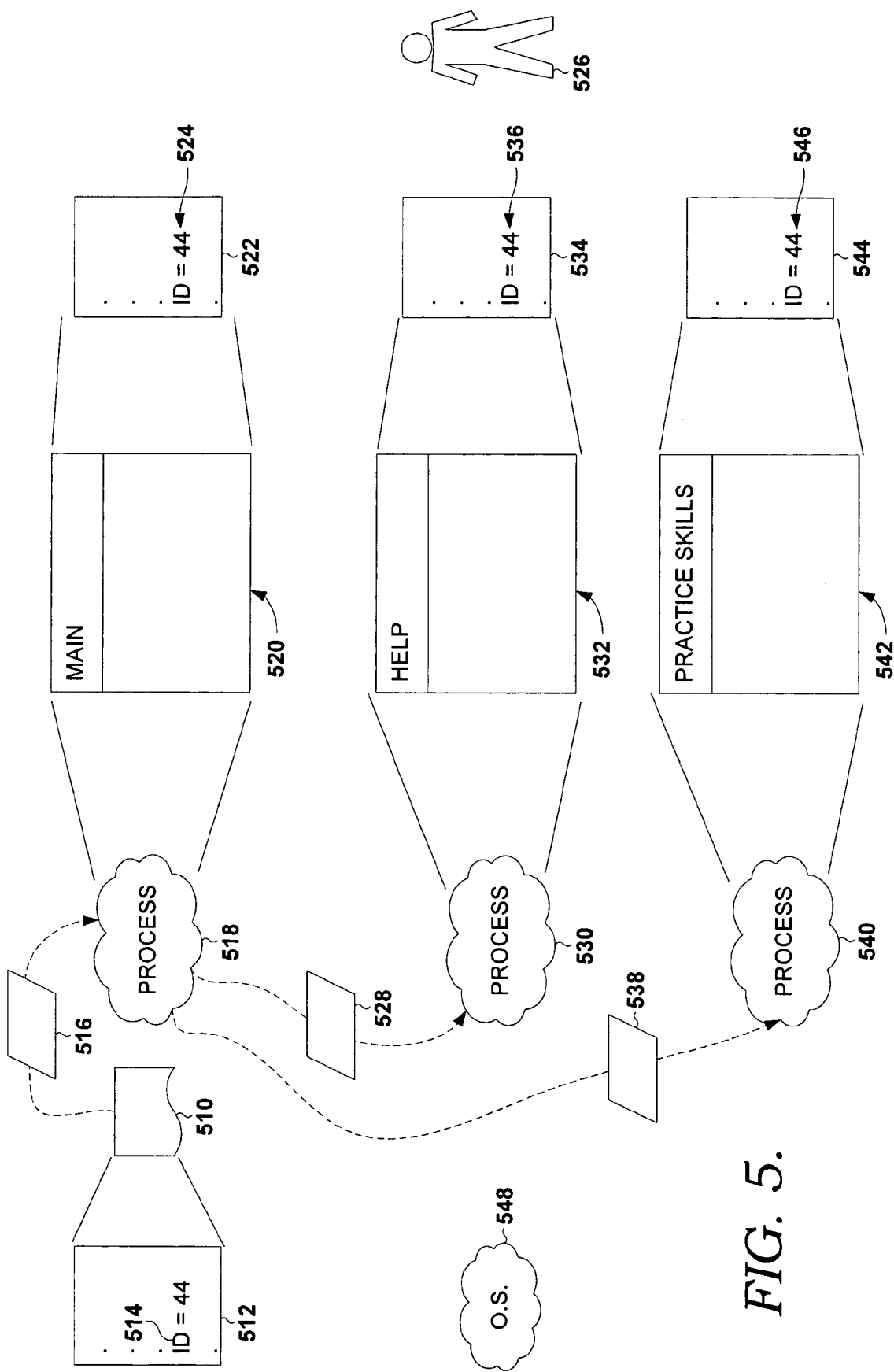
FIG. 5 depicts an instance of a first process giving rise to multiple other processes.
Figure 6:
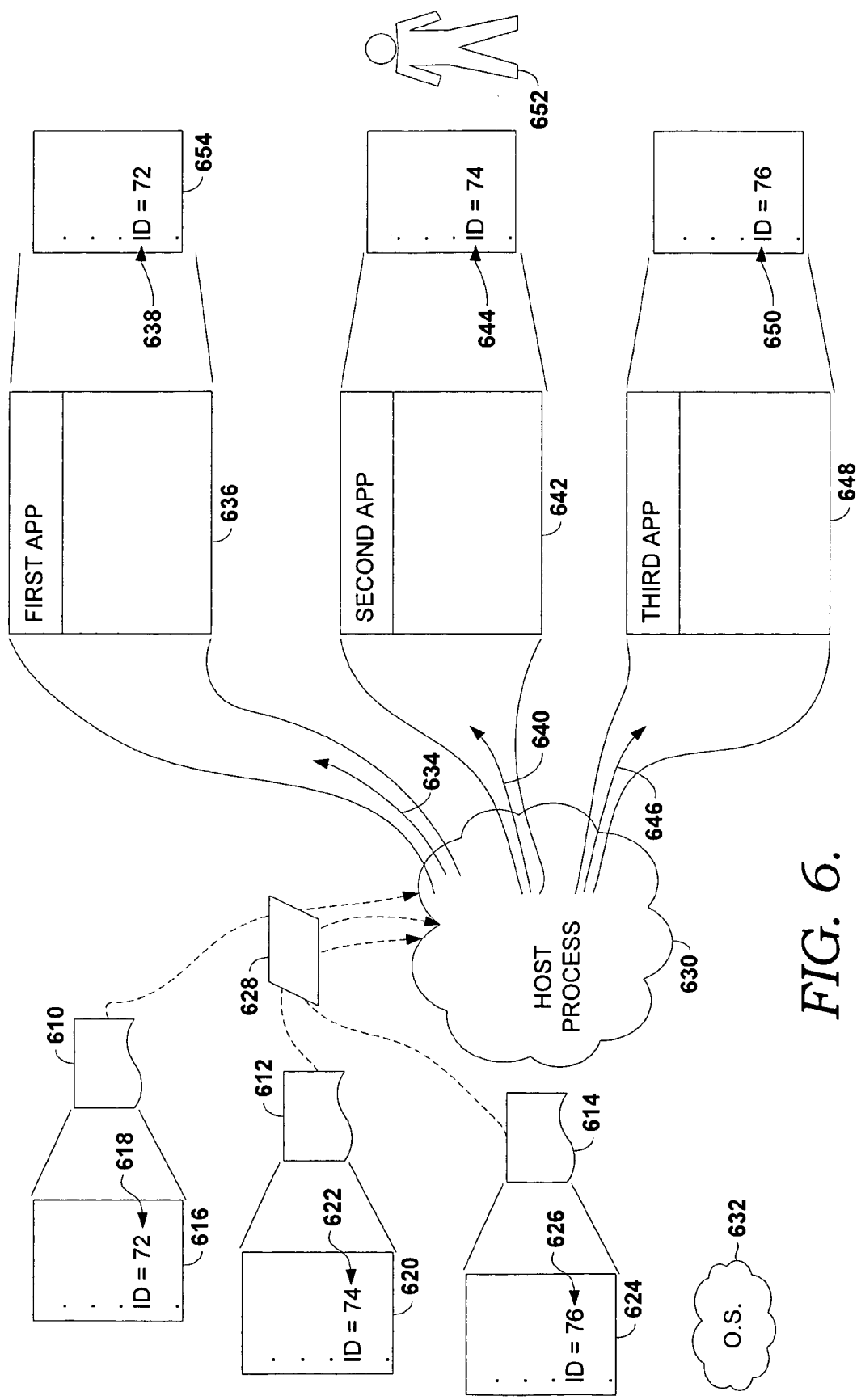
FIG. 6 depicts distinct application launchers giving rise to distinct instances of applications.

We are leading up to describing various embodiments of methods for intelligently presenting buttons and application launchers, but that explanation will be more fruitful if it is provided with the ability to refer to different components of the invention. FIGS. 5 and 6 will help in this regard.

Turning first to FIG. 5, we will show an application launcher 510 that is respectfully associated with a set of properties 512, one of which is an application ID 514. Application identifier 514 provides for the ability to unambiguously identify a windowed process that is associated with application launcher 510. Application launcher 510 can be used to trigger a file or other component 516 that spawns a first process 518. Process 518 may be represented to a user by way of window 520, which we will refer to as a "main" window.

Main window 520 is associated with its own set of properties 522 in one embodiment, one of which is also an application identifier 524, which process 518 received as it was being launched. That is, as process 518 is being launched, it is informed of the specific application launcher 510 that was used to launch it. As we just described with reference to FIG. 4, it may be the case that separate processes are spawned off different files, but would appear to a user 526 as being part of the same process.

For example, it may be the case that process 518 can be utilized to leverage another file 528 (separate from file 516) that spawns a second process 530, which is presented in another window 532, which has a corresponding set of properties 534 with it. In one embodiment of the present invention, as process 530 is launched, process 518 informs it of its associated application identifier 514. This enables window 532 to have an application identifier 536 with a value the same as that of main window 520; namely, "44."

In some embodiments, the application IDs are not identical but may share a common prefix that is referenced in connection with determining what buttons to present. Doing so would prevent a button associated with process 530 from replacing a button associated with process 518 because the application IDs are identical. We show application identifiers 524 and 536 to be identical to that of application launcher 510 to convey a general concept that if such identity of identifiers is desirable, then it is possible.

Similar to the above method, process 518 may leverage another file 538 to spawn still a third process 540, which is associated with an illustrative window 542 ("practice skills"), which is associated with its own set of properties 544, one of which includes an application identifier 546. The embodiment of FIG. 5 may stem from a gaming environment, where separate processes give rise to what an operating system may perceive as a separate application, but which users would reasonably think to be part of a common application. Although operating system 548 may view processes 518, 530, and 540 as being different, application identifiers 524, 536, and 546 can be utilized by instructions 116 (and in some embodiments in connection with other parameters not shown) to group them together.

Turning now to FIG. 6, a first application launcher 610 is shown as well as a second application launcher 612, and a final illustrative application launcher 614. Application launcher 610 has a corresponding set of properties 616, one of which includes an application identifier 618. Similarly, application launcher 612 includes its own set of properties 620, one of which includes its own application ID. Application launcher 614 includes a set of properties 624, one of which is its own respective application ID 626.

The dashed lines are shown to help indicate that each launcher 610, 612, and 614 are associated with a common file 628 that spawns a process, and in this example a host process 630. Thus, file 628, which actually may be a set of files, gives rise to a single process 630, which operating system 632, or components thereof, might see as a single process. But host process 630 has the ability to spawn 634 a first application 636, which is associated with a first application identifier 638. Similarly, host process 630 may spawn 640 a second application 642, which is associated with its own application identifier 644.

By way of a final example, host process 630 may spawn 646 a third application 648, which is associated with its own application identifier 650. Note that application identifiers 638, 644, and 650 each have different values even though they are associated with the same host process 630, which was spawned by a single entity 628. This is possible because in an embodiment of the present invention, host process 630 receives application-identification information that is respectively provided by the launching mechanisms that were used to give rise to the respective first, second, and third applications.

That is, when application launcher 610 requested what would become windowed process 636, it provided its application identifier 618 during the launching process so that first application 636 can wind up with the same value ("72") for its application identifier 638. This is the same process that happens two additional times in a similar manner in connection with launching second application 642 and third application 648.

This is useful to user 652, who may want to assign application launchers to the specific instances of the application shown. That is, user 652 may wish to associate an application launcher with first application 636. One example of this may be a specific webpage. There are a variety of examples of applications running within the same host process. We have provided at least one illustrative example so far: that of a web-browsing context. In a web-browsing context, the specific web browser may be viewed by operating system 632 as a single process 630, but actually include multiple instances that take the form of separate windows or separate tabs.

The prior art was unable to associate a launcher with such a specific instance of an application while providing the ability to distinguish that instance from another instance in the context of unification so that a specific launcher corresponding to first application 636 could be unified with a button that also is operable to present first application 636. Another example of a host process being utilized to host multiple applications is appearing in the context of remote-desktop utilities, or what some refer to as terminal services. Remote-desktop utilities provide the ability for a user to have presented on his or her screen the user interface of a remote computer.

Thus, a user in California can remote in to her home computer in Missouri and interact with that home computer as though she were local to the computer. It may be the case that instead of presenting an entire computer, or an entire desktop, what is desired to be remotely presented is only a specific application. For example, it might be desirable that employees be given access to an application that utilizes functionality identical or akin that offered by terminal services or another remote-desktop technology. For example, perhaps only a word-processing program is to be remoted to a user's computer. Perhaps only a presentation-software program is to be remoted to a remote user instead of a UI of an entire computer.

In such a paradigm, an umbrella remoting utility may take the form of host process 630, but specific instances of the remoting utility (such as the word-processing program and the presentation program) run as separate windowed processes, and thus would be akin to first application 636 and second application 642. In such an example, operating system 632 may see only a single process 630, the remoting-utility process, whereas user 652 would see what appears to be two applications; namely, first application 636 and second application 642.

An embodiment of the present invention would enable user 652 to pin or provide an application launcher in a portion of a user interface, and have that specific application launcher disappear when that specific instance of the application is launched, but not disappear incident to launching the umbrella remoting utility. Offering this granular and lower level ability to control unification of a set of application launchers and a set of buttons or switchers is an illustrative improvement over the current state of the art offered by an embodiment of the present invention.

Another example of applications running within a same host process would be something akin to the way file-browsing programs operate in operating systems, which generally offer functionality such as presenting items in a view, presenting search results, presenting items in a window that are used to control how a computer works.

All of these different items may run in a separate window, but the operating system may view them as a single process. According to an embodiment of the present invention, a user would be able to end (minimize) a specific instance, or functional aspect, of such a file-browsing program (among many potential instances), and have that specific instance unified with a switcher button only when the specific instance of that program is run—instead of when any other disparate window is running that may stem from a common process.

Having described the invention in some detail, and provided some illustrative operating environments, we will now describe with a little more structure, illustrative methods that are available according to embodiments of the present invention.

Figure 7:
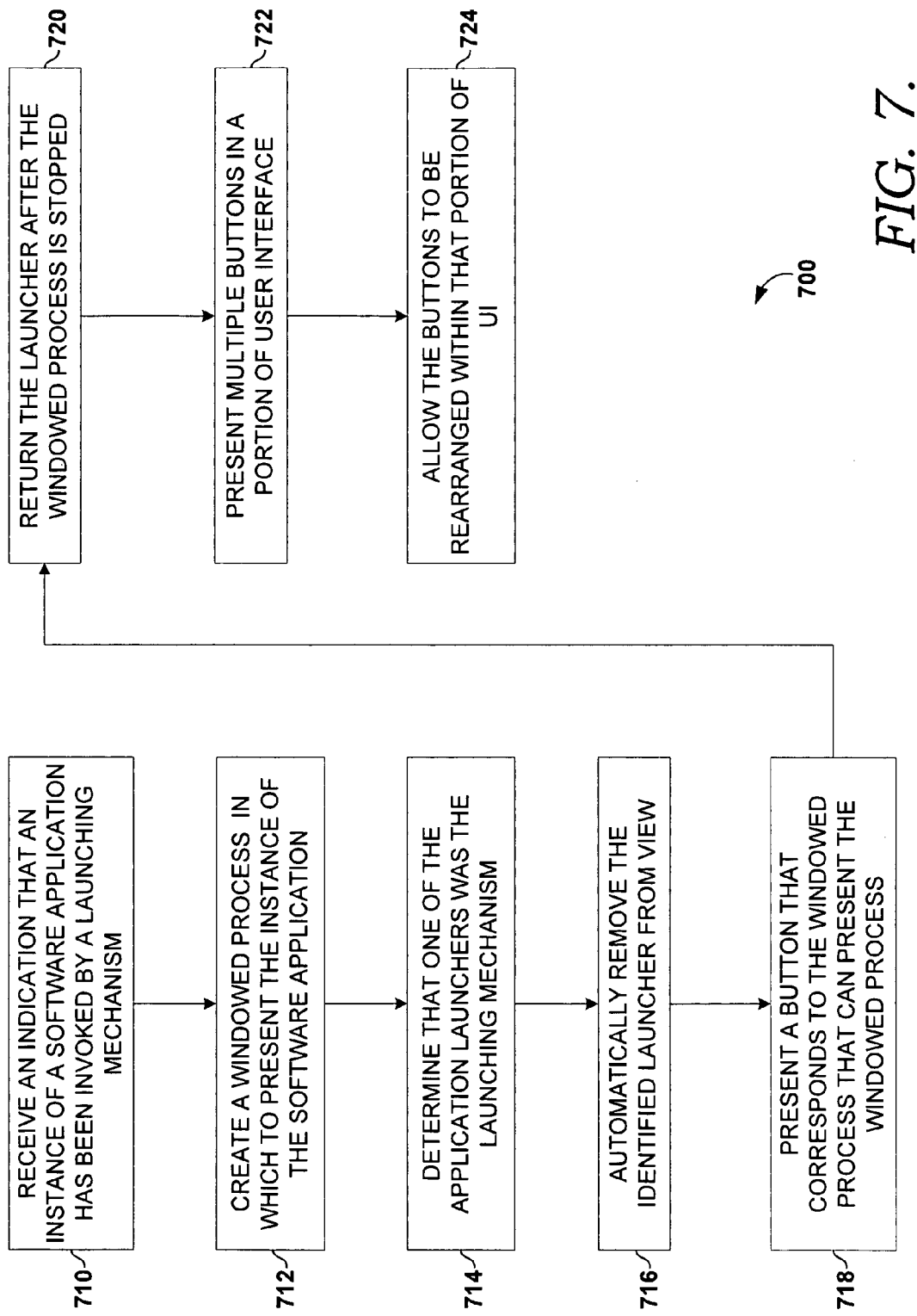
FIG. 7 depicts an illustrative method for presenting buttons and application launchers according to an embodiment of the present invention.

Turning now to FIG. 7, an illustrative method of intelligently presenting 1) buttons that correspond to one or more running windows, and 2) a set of application launchers that launch instances of software applications is provided and referenced generally by the numeral 700. What is shown in FIG. 7 is one embodiment of the present invention. At a step 710, an indication that an instance of a software application has been invoked by a launching mechanism is received.

For example, in one embodiment, a user may click launching mechanism 610 of FIG. 6. Launching mechanism 610 might be any of the icons represented in user interface portion 150, 250, or 450. This would lead to the creation of a windowed process in which to present the instance of a software application, which is referenced by numeral 712. Creating the windowed process in step 712 includes creating a specific windowed process that maps to an instance of a software application. This instance of a software application may include an instance of an application that is hosted by a process that is hosting other applications. Thus, in some embodiments it is one of multiple instances of itself, and in other embodiments it is a different application than other applications that are hosted by a common process, such as host process 630.

At a step 714, it is determined that one of the application launchers was the launching mechanism. Thus at step 714, instructions 116 determine that the launching mechanism that was used to launch the instance of the software application is the same as at least one of the application launchers, such as application launcher 154. To provide an example, and with reference to FIG. 1, if it were the "My Page" window 122 that was created, then at a step 714, it would be determined that launcher 158 was the launching mechanism that gave rise to windowed process 122. This can happen in a variety of ways.

We have briefly mentioned at least one way that this can occur. In one embodiment, this occurs by inspecting attributes associated with the windowed process, and then comparing attributes of the launching mechanism with attributes of the launchers to determine whether any of the launchers are the same as the launching mechanism. Again, by way of example, this would include inspecting attributes of the windowed process, such as those referenced by numeral 654 in FIG. 6, and then comparing those attributes 654 with attributes 616 of the launching mechanism 610, as well as any other launching mechanisms that are in the set 154.

In an alternative embodiment, a way of determining that at least one of the launchers 154 was the launching mechanism (which could reside anywhere on computing device 112) is to reference the launching mechanism 610 to determine a first application identifier 618 associated with the launching mechanism 610. The first application identifier 618 identifies a corresponding windowed process 636 that is launched by launching mechanism 610. This application identifier 618 can be compared against a pool of application identifiers that are respectively associated with the launchers in the set of application launchers 154 for example. At least one application identifier of the pool 154 can be identified as matching the first application identifier 618.

Summarily, the application identifier of the launching mechanism that was used to launch the instance of the running process is compared against the application identifiers in the set of quick launch icons to determine whether there is a match to any of the icons. If so, those quick launch icons are removed from view, and a button corresponding to the running windowed process is presented. The removal of such identified launcher is reflected in step 716. At a step 718, a button that corresponds to the windowed process is presented that is capable of presenting the windowed process.

One way in which the launching mechanism can be referenced to determine the first application identifier is to inspect properties 654 of a window 636 that is presenting the windowed process (we distinguish for referential purposes) to identify the launching mechanism 610. In this embodiment, the window 636 includes as one of the properties 654 an identification of the launching mechanism (not shown) that can be used to identify it and locate the launching mechanism. Thus, an identifier that identifies the actual launching mechanism can be included as one of the properties 654 associated with a windowed process 636.

Another way that referencing the launching mechanism 610 to determine the first application identifier 618 is to reference the process 630 that gave rise to the windowed process 636. This process can be utilized to source a query to retrieve an identification of the launching mechanism 616. So in this example, host process 630 can be used to source a query of the operating system or other resolving component to retrieve back information regarding the launching mechanism that launched the host process 630.

Host process 630 is capable of providing this information because it was provided this information itself incident to being spawned. That is, when host process 630 was spawned, it was informed which launching mechanism (e.g., of 610, 612, and 614) launched it. Having received an identification of the launching mechanism, it can provide an indication of the launching mechanism.

At a step 720, the launcher is returned after the windowed process has stopped. Thus, incident to receiving an indication that the windowed process has been closed, an embodiment of the present invention provides for automatically returning whatever launchers were identified as being redundant to view, and consequently hiding the respective button that was previously being presented and associated with its corresponding window.

In fact, an embodiment of the present invention enables a whole set of buttons 164 to be presented in a user interface portion 152, wherein each of the buttons respectively corresponds to a windowed process (such as 122, 124, 126, 128, and 130). Moreover, an embodiment of the present invention enables the buttons to be rearranged in the UI portion according to an order defined by the user. An example of this process is provided in FIG. 10, which we will discuss now.

Figure 10:
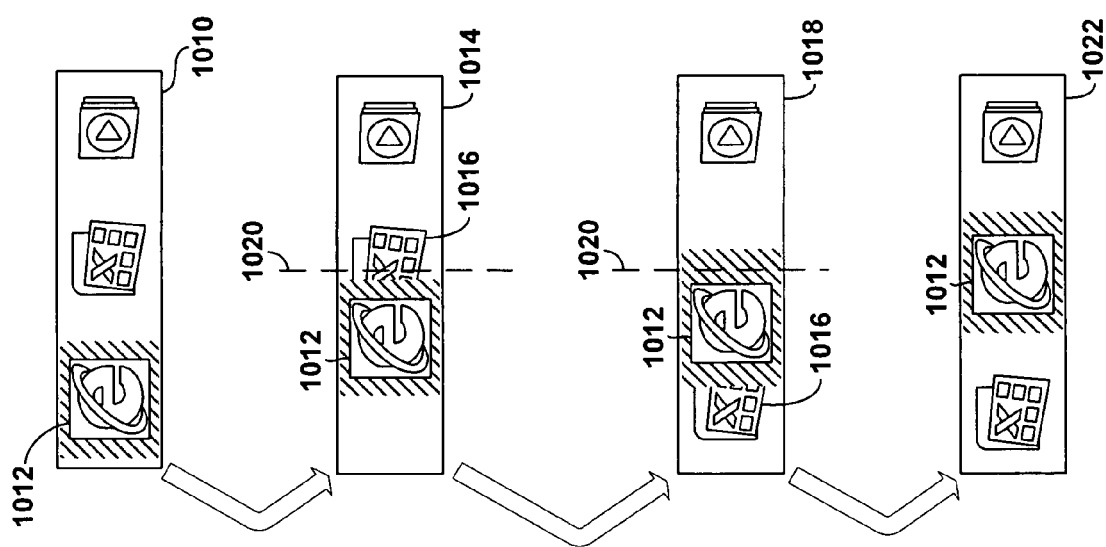
FIG. 10 depicts a preview option for previewing a movement of rearranging of an icon in a bounded screen portion of a user interface according to an embodiment of the present invention.

Turning briefly to FIG. 10, a first view 1010 shows a first icon 1012 that is to be rearranged. View 1014 shows how icon 1012 is approaching some threshold of another icon 1016. As that threshold is crossed, which is shown in view 1018, that icon 1016 is moved to a side of icon 1012 to provide a preview of a possible appearance of a view after the icon 1012 is moved to its desired position. Thus, after crossing some threshold (which is represented by numeral 1020), an icon associated with that threshold is moved even prior to the completion of a desired move of the original icon 1012. View 1022 shows the desired icon 1012 moved into its new position.

Returning now to FIG. 7, we explained how multiple buttons can be presented in a portion 152 of a user interface at a step 722, and how an embodiment of the present invention allows those buttons to be rearranged within that portion 152 of the user interface at a step 724.

Figure 8:
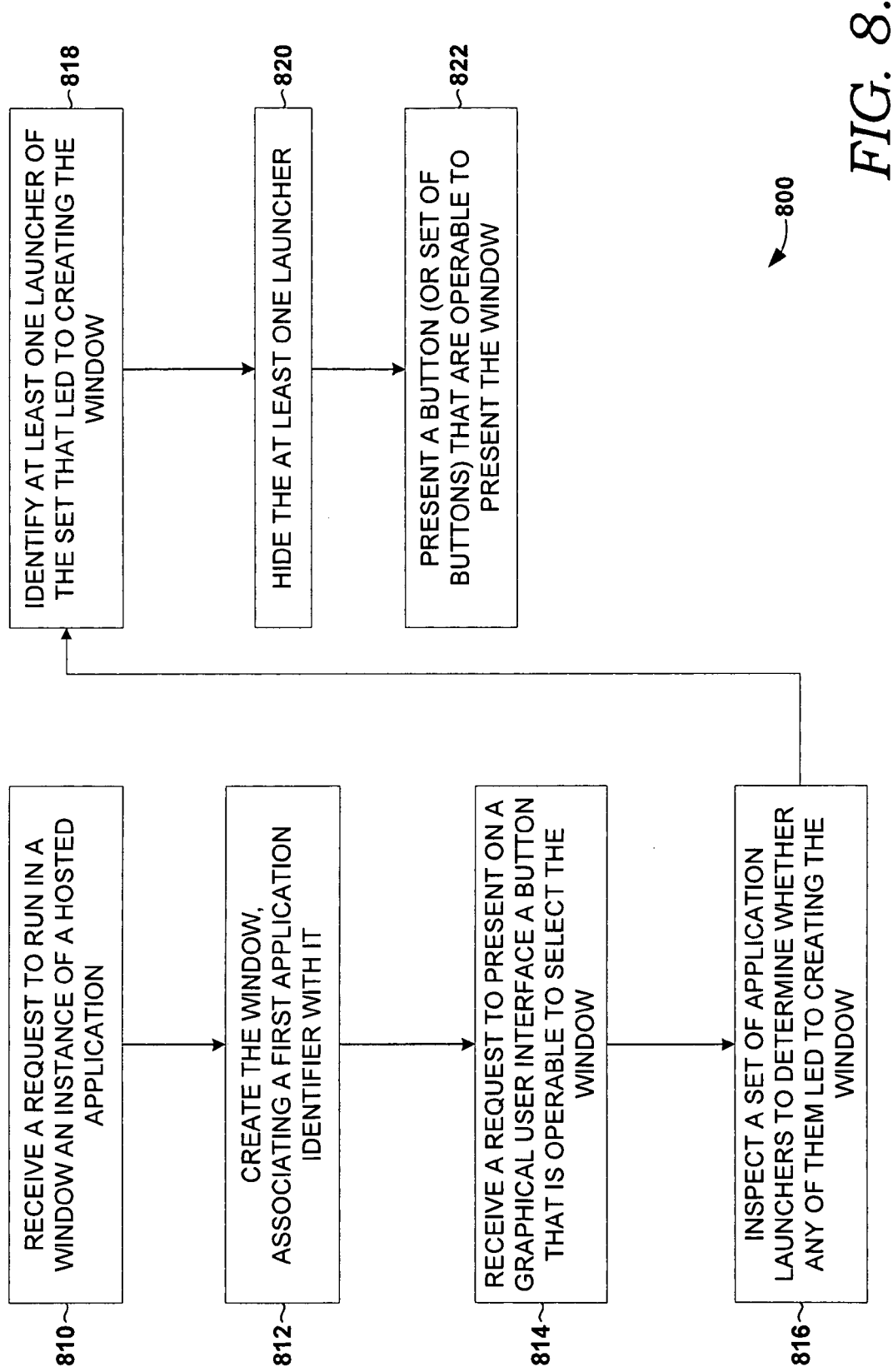
FIG. 8 depicts another illustrative method for intelligently presenting buttons and application launchers according to an embodiment of the present invention.

Turning now to FIG. 8, another illustrative method for intelligently presenting both buttons and application launchers is provided and referenced generally by the numeral 800. At a step 810, a request is received to run in a window an instance of a hosted application. Again, this may be more granular than simply running an application, but may refer to running a specific instance of a hosted application, which is different than merely running an application. The hosted application is an application running within some host process that is capable of hosting multiple instances of the application such that the instances cannot be distinguished merely by inspecting only an entity such as an executable file that spawned the process. At a step 812, the window is created, being associated with a first application identifier. That is, when a window such as first application 636 of FIG. 6 is created, it is associated with the first application identifier 654.

At a step 814, a request is received to present on a graphical user interface 152 a button that is operable to select a window. Illustrative buttons are referenced by numeral 164 on FIG. 1. At a step 816, a set of application launchers, such as 154, is inspected to determine whether any of them 154 led to creating the window. Turning now to FIG. 6 to illustrate this example, application launchers 610, 612, and 614 are inspected to determine whether any of them led to creating one of the windows, such as first application window 636. We have previously mentioned a variety of ways that this can be accomplished.

A first way is to retrieve from first application window 636 an application identifier 654, and then use that to compare to the application identifiers 618, 622, 626 to determine whether there is a match. The properties associated with windows such as windows 636, 642, and 648 do not need to actually be stored with the windows in a meta-data form but can be stored in another repository such as that of data store 118. We have also explained that host process 630 can be utilized to request identification information that identifies which application launcher of 610, 612, and 614 actually gave rise to the specific instance of the application 636. In still other embodiments, application identifier 618 and 638 are provided during installation of a program that is used to launch first application 636.

In still other embodiments, the properties 616 of application launcher 610 are inspected to determine whether application launcher 610 led to the launching of first application 636. An example of such an inspection may inspect items such as a parameter list (referenced by numeral 144 in FIG. 1) as well as inspecting a name 142 to determine whether they are the same as those associated with first application window 636. If they are the same, then a determination is made that such an application launcher was indeed the application launcher that led to creating first windowed process 636. These are different ways that step 818 can be accomplished wherein at least one launcher of the set is identified that led to creating the window 636.

Another way that this can be accomplished is to receive an application identifier that has been promulgated through chained processes. For example, in situations such as that of FIG. 5, an embodiment of the invention includes associating with a window, such as window 520, an application identifier 522 by doing so as main window 520 is created. An example of enabling identification of a window such as 532, that which may be associated with its own process 530 but the same launching mechanism 510, is to make process 530 aware of application identifier 514 as it is spawned, which can be done because process 518 is aware of application identifier 514 because it was made aware of this identifier when it was launched.

At a step 820, the identified launcher or launchers are hidden from view. A button is presented at step 822 that is operable to present the desired window. In some embodiments, multiple buttons are presented and grouped together that respectively are operable to present different windows.

Figure 9:
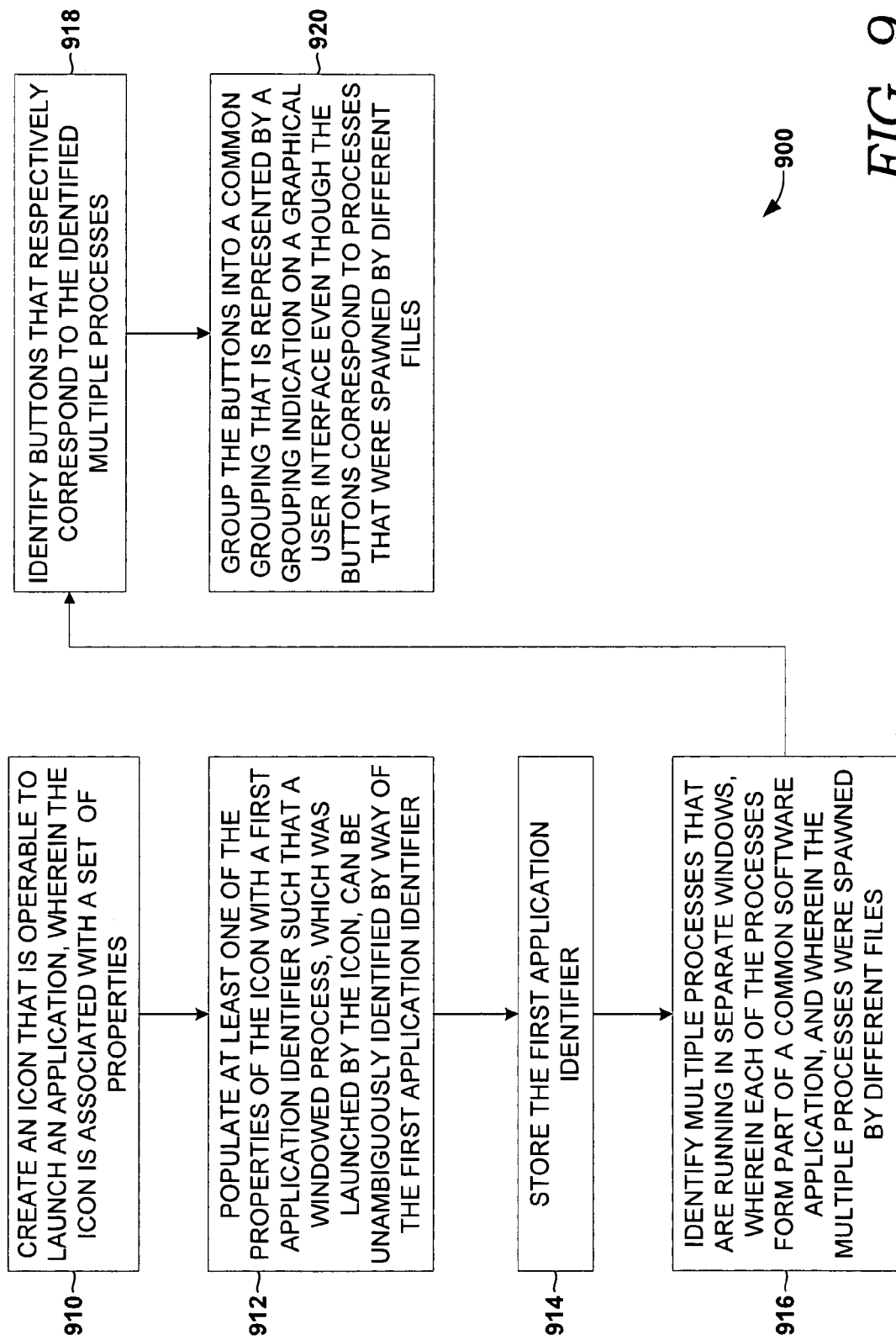
FIG. 9 depicts an illustrative method for managing visual cues(?) of items running on a computing device.

Turning now to FIG. 9, a method is shown in flowchart form for managing visual indications of items running on a computing device. Illustrative examples of visual indications of items that are running include what we have previously described as buttons, also known as "switchers" or "switching buttons." At a step 910, an icon is created that is operable to launch an application. The icon is associated with a set of properties. In one embodiment, the operating system is utilized to facilitate the creation of such an icon. With reference to FIG. 1, illustrative icons are shown as being part of screen 120. With further reference to FIG. 1, illustrative properties that might be associated with the various icons are indicated by reference number 140.

At a step 912, at least one of the properties is populated with a first application identifier such that a windowed process, which was launched by a second launching mechanism, can be unambiguously identified by way of the first application identifier. With reference to FIG. 1, note that there exists two media-player icons: 138 and 176. The icons 138 and 176 are located in different places. As shown, media-player icon 138 is located in a desktop area, whereas media-player icon 176 is located in a subdirectory, namely "c:\programs\all." For purposes of this example and explanation, it is assumed that each of the media-player icons launches the same windowed process 126. Based on step 912, at least one of the properties 140 of an icon 138 will be populated with an application identifier 148 such that a windowed process 126 that was launched by the icon 138 (or any other launching mechanism) can be unambiguously identified by way of the first application identifier 148. Media-player icon 176 will be given the same application identifier as 138. Thus, in the example shown for sake of simplicity, each icon 138 and 176 will be populated with an application identifier value of "18."

At a step 914, the first application identifier is stored. By way of example, the first application identifier 148 is stored. As mentioned, this value can be stored as metadata associated with the icon 138 in some embodiments, or in other embodiments it may be stored in a different repository such as repository 118. With this first application identifier stored, it can serve as a reference to determine whether a second launching mechanism is the same as the icon by inspecting a second application identifier that is associated with the second launching mechanism. An example of this would be inspecting an application identifier associated with a second launching mechanism (e.g., media playing icon 176) to determine whether 176 is the same as the original icon 138 that was used to launch some application. A matching of the first and second application identifiers would indicate that the first icon 138 is the same as a second launching mechanism 176.

Although not shown for the sake of conciseness on FIG. 9, additional steps could include receiving indications of desired icons that are to form a designated set of icons that are usable to launch one or more of: an application, one or more instances of an application, and one or more portions of an application. These indications may be received by a user in some embodiments. For example, a user may indicate icons 154 as being a set of desired icons to form such a designated set. This set of icons 154 is usable to launch not only an application but also a particular instance of an application or even a portion of an application. Each of the desired icons 154 can be associated with their own respective application identifiers. Thus browser icon 156 would be associated with a certain application identifier, specific-browser icon 158 would be associated with a different application identifier, and application 160 would be associated with still a different application identifier.

Visual indications of running windowed processes could also be provided. Each windowed process would have been launched by a certain launching mechanism. In FIG. 1, buttons 166, 168, 170, and 172 provide visual indications of running windowed processes 122, 124, 126, and 128. And as mentioned, an embodiment of the present invention provides for determining whether any of the designated set of icons 154 is the same as a certain launching mechanism that gave rise to a windowed process, and, if so, then removing any identified matching icon from the designated set of icons 154 while maintaining visibility of the visual indication. By way of example, if specific-browser icon 158 were used to launch window 122, then it would be removed as button 170 was created. Moreover, if windowed process 122 was launched by any mechanism from anywhere, not just launcher 158, launcher 158 would still be removed because launcher 158 would be inspected, and it would be determined that launcher 158 corresponded to windowed process 122, which would result in its removal.

We have previously described that such as determining whether any of the designated icons 154 are the same as some launching mechanism could be accomplished by comparing the application identifiers of the other launching mechanism with each of those in the set 154. It should be understood that in some embodiments each member of set 154 is inspected, while in other embodiments to inspect each member implies that members are inspected until a match is found.

As an indication is received that this relevant windowed process is no longer running, then the visual indication corresponding to that windowed process is removed from visibility, and the launcher of set 154 that was previously removed is returned to view. Thus, if browser window 122 is closed, then button 170 will be removed from view, and launcher 158 will be returned to the set of 154.

At a step 916, multiple processes are identified that are running in separate windows. Each of the processes form part of a common software application. The multiple processes were spawned by different files. We have discussed this example with reference to FIG. 5 already. At a step 918, buttons can be identified that respectively correspond to the identified multiple processes. These buttons can then be grouped together and represented by a grouping indication at a step 920 even though the buttons correspond to processes that were spawned different files.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-executable instructions embodied thereon for performing a method of intelligently presenting (1) buttons that correspond to one or more running windows and (2) a set of application launchers that launch instances of software applications, the method comprising:
presenting the set of application launchers in a user interface area that is separate from any windowed processes;
receiving an indication that an instance of a software application has been invoked by a launching mechanism, and creating a windowed process in which the instance of the software application is presented;
determining that at least one of the application launchers displayed in the user interface area that is separate from any windowed processes at the time of invocation was the launching mechanism;
automatically removing the at least one of the launchers from the user interface area that is separate from any windowed processes irrespective of a state of said windowed process, wherein the at least one of the launchers is no longer displayed when removed, and wherein said state includes at least one of maximized, minimized, and in between;
based on the removing of the at least one of the launchers from the user interface area that is separate from any windowed processes, presenting a button that corresponds to the windowed process, the button being operable to present the windowed process; and
incident to receiving an indication the windowed process has closed, returning the at least one of the launchers to the user interface area and removing said button that corresponds to the windowed process.

2. The media of claim 1, wherein determining that the at least one of the launchers was the launching mechanism comprises:
identifying the launching mechanism by inspecting attributes associated with the windowed process; and
comparing attributes of the launching mechanism with attributes of the launchers to determine whether any of the launchers are the same as the launching mechanism.

3. The media of claim 2, wherein a plurality of buttons are presented in the user interface area that is separate from any windowed process, each of the plurality of buttons respectively corresponding to a windowed process, and further comprising enabling the plurality of buttons to be rearranged in the user interface area according to an order defined by a user.

4. The media of claim 3, wherein the enabling includes enabling a preview of button placement by performing a process comprising:
determining when a first button crosses a threshold portion of a second button, and
moving the second button to accommodate a proposed placement of the first button, thereby enabling a user to preview how a proposed rearrangement on the first button would appear.

5. The media of claim 1, wherein determining that at least one of the launchers was the launching mechanism comprises:
referencing the launching mechanism to determine a first application identifier associated with the launching mechanism, wherein the first application identifier identifies a corresponding windowed process that is launched by the launching mechanism; and
comparing the first application identifier against a pool of application identifiers that are respectively associated with the launchers in the set of application launchers; and
identifying at least one application identifier of the pool that matches the first application identifier.

6. The media of claim 5, wherein referencing the launching mechanism to determine the first application identifier includes one or more of the following:
(1) inspecting properties of a window that is presenting the windowed process to identify the launching mechanism, wherein said window includes as one of its properties an identification of the launching mechanism which can be used to identify and locate the launching mechanism; and
(2) referencing a process that gave rise to the windowed process, and utilizing the process to source a query to retrieve an identification of the launching mechanism.

7. The media of claim 1, wherein each of the application launchers is a quick-launch icon that remains displayed, whether or not windowed processes are maximized, until the launcher is determined to have launched a windowed process and is automatically removed from view.

8. A computer-implemented method of intelligently presenting (1) buttons that correspond to one or more running windows and (2) application launchers that launch instances of software applications, wherein the presenting occurs in an environment where a certain single process can host multiple instances of an application, the method comprising:

presenting a plurality of application launchers in a user interface area separate from a windowed process, wherein the launchers, when selected, present in a window an instance of a hosted application, the hosted application being an application running within a first host process that is capable of hosting multiple applications, including multiple instances of a same application, such that the instances cannot be distinguished by inspecting only an executable file that spawned the process;

receiving a user selection of one of the plurality of application launchers;

associating a first application identifier with the window resulting from the user selection, the first application identifier being based at least in part upon an application identifier of the selected application launcher that led to the creation of the window;

presenting on a graphical user interface a button that is operable to select the window;

inspecting the plurality of application launchers, each launcher having an application identifier, to determine whether any of the launchers led to creating the window by comparing the first application identifier to the application identifiers of the launchers, wherein a launcher can be unambiguously and uniquely identified, by way of the corresponding application identifier, as being the only launcher that could have launched the created window;

identifying the application launcher that led to creating the window;

hiding the launcher that led to creating the window; and based on hiding the launcher that led to creating the window, presenting a button that is operable to present the window.

9. The method of claim 8, wherein associating the window with a first application identifier is accomplished as the process is spawned, such that the process is aware of which specific launcher launched the process, and such that identifying information useable to locate the specific launcher can be determined by inspecting attributes of the process.

10. The method of claim 9, wherein identifying at least one application launcher is accomplished by a process that includes matching the first application identifier to at least one application identifier that is respectively associated with at least one of the application launchers in the set.

11. The method of claim 8, wherein launcher application identifiers are specific enough to identify the application running within the first host process even though the application may be:
one of multiple instances of itself; or
one of multiple applications being hosted by the first host process.

12. One or more computer-readable storage media having computer-executable instructions embodied thereon for performing a method of providing for managing visual indications of items running on a computing device, the method comprising:
providing a first launching mechanism that is operable to launch an application, the first launching mechanism having a plurality of properties;
populating at least one of the plurality of properties of the first launching mechanism with a first application identifier that uniquely identifies the first launching mechanism such that when a windowed process is launched by the first launching mechanism, the first launching mechanism can be unambiguously and uniquely identified, by way of the first application identifier, as being the only launching mechanism that could have launched the windowed process; and
storing the first application identifier,
(1) wherein the first application identifier serves as a reference to determine whether a second launching mechanism is the same as the first launching mechanism by inspecting a second application identifier that is associated with the second launching mechanism, and
(2) wherein a matching of the first and second application identifiers indicates that the first launching mechanism is the same as the second launching mechanism,
such that visual indications of items running on a computing device can be grouped together based, at least in part, on the first application identifier.

13. The media of claim 12, further comprising:
receiving indications of desired icons that are to form a designated set of icons that are useable to launch one or more of the following,
(1) an application;
(2) one or more instances of an application; and
(3) one or more portions of an application;
associating each of the desired icons in the designated set with a corresponding icon identifier.

14. The media of claim 13, further comprising providing a visual indication of the running windowed process, the windowed process being launched by a certain launching mechanism.

15. The media of claim 14, wherein the visual indication includes a button that is operable to be selected, and when selected, presents the windowed process.

16. The media of claim 14, further comprising determining whether any of the designated set of icons is the same as the certain launching mechanism, and, if so, then removing any identified matching icons from the designated set of icons while maintaining visibility of the visual indication.

17. The media of claim 16, wherein the determining is accomplished by comparing an application identifier of the certain launching mechanism with the application identifiers of the desired icons in the designated set.

18. The media of claim 16, further comprising:
receiving an indication that the windowed process is no longer running;
removing from visibility the visual indication; and
upon removing from visibility said visual indication, immediately returning the identified matching icon(s) to the designated set.

19. The media of claim 13, further comprising:
identifying multiple processes that are running in separate windows, wherein each of the processes form part of a common software application, and wherein the multiple processes were spawned by different files;
identifying buttons that respectively correspond to the identified multiple processes, said buttons being operable to respectively present the windowed processes; and
grouping the buttons into a group that is represented by a grouping indication on a graphical user interface.

* * * * *